July 26, 1955

E. M. BARBER ET AL 2,713,790

ROTATIONAL VISCOMETER

Filed Oct. 12, 1951

INVENTORS
EVERETT M. BARBER
JAMES R. MUENGER
FREDERICK J. YILLFORTH, JR.
BY
ATTORNEYS

United States Patent Office 2,713,790
Patented July 26, 1955

2,713,790

ROTATIONAL VISCOMETER

Everett M. Barber, Wappingers Falls, and James R. Muenger and Frederick J. Villforth, Jr., Beacon, N. Y., assignors to The Texas Company, New York, N. Y., a corporation of Delaware Application October 12, 1951, Serial No. 251,004

2 Claims. (Cl. 73—60)

This invention relates to rotational viscometers and is especially directed to thin film viscometers operating with high shear rates.

In the typical rotational viscometer the material to be tested is contained in an annular space between concentric cylinders. The inner cylinder is rotated, the resultant shearing forces in the material being tested tend to turn the outer cylinder, and the force required to restrain it is proportional to viscosity. When operating this type of instrument at high rates of shear, great difficulties have been encountered on account of the uncertainties as to the temperature of the film and as to the thickness of the film. The uncertainty is largely due to the normal outward dissipation of the heat which causes the inner cylinder to be hotter than the outer one. These thermal effects have led to erroneous results in the past and have cast considerable doubt as to the validity of the results.

In accordance with the invention a rotational viscometer is provided having a hollow rotor mounted within a stator and provided with internal and external cooling so as to establish heat flow in both directions from the center of the film of the material being tested. By having the heat flow in both directions from the center of the film the temperature gradient in the film can be reduced to a negligible value. The invention, moreover, contemplates provision for the equalization of the inward and outward heat flow paths.

In the construction of our rotational viscometer the inner cylinder or rotor is bored and the bore diameter is preferably selected so that the heat path from the film surface to the bore surface of the inner cylinder is substantially equal in resistance to the heat path from the film surface to the outer surface of the outer cylinder; the bore surface of the inner cylinder and the outer surface of the outer cylinder are maintained at the same temperature by being placed in contact with a temperature control liquid. Axial heat flow is minimized by appropriate heat barriers at the ends of the cylinders. Under these conditions the film temperature gradient is reduced four-fold, differential expansion is nil, provided both cylinders are of the same material or material of approximately the same coefficient of expansion, and the axial temperature gradient can be made negligible so that the dissipation of heat may be symmetrical with reference to the axis. Axial symmetry is only possible if heat is removed from the interior of the inner cylinder.

By the term "equal heat path," as used herein, reference is made to having the same temperature at the inner surface of the inner cylinder and at the outer surface of the outer cylinder, using a single coolant liquid at a constant temperature and at the same time having equal heat flow from the test film in both directions through the two cylinders. This may be accomplished by applying the following heat transfer equation to both the inner and outer cylinders: Where $q$ = the heat flow per unit time for a unit axial length and is a constant across any element, in other words, it represents the heat put in at one boundary and removed at the other, subscripts denoting specifically:

$q_o$ = heat flow through the outer cylinder.
$q_i$ = heat flow through the inner cylinder.
$K$ = heat conductivity constant.
$A$ = the area perpendicular to heat flow for any element of unit axial length.
$r$ = the radius of any element, subscripts denoting specifically:
$r_1$ = inner radius of the outer cylinder (i. e. of the interface or film) and also
$r_1$ = outer radius of the inner cylinder (i. e. of the interface or film).
$r_2$ = outer radius of the outer cylinder.
$r_3$ = inner radius of the inner cylinder.
$t$ = temperature of any element and subscripts denote specifically:
$t_1$ = temperature of the interface or film (i. e. surface at $r_1$).
$t_2$ = temperature of the coolant (i. e. of outer and inner surfaces at $r_2$ and $r_3$).
$C$ = integration constant.
$d$ = customary differentiation operator $$q = -KAdt/dr = -K2\pi r dt/dr$$
$$qdr/r = qd(lnr) = -2\pi K dt$$

Integrating:

$$q(lnr) = -2\pi KT + C$$

for the outer cylinder:

$$q_o = -2\pi K(t_2 - t_1)/ln(r_2/r_1)$$

for the inner cylinder:

$$q_i = -2\pi K(t_2 - t_1)/ln(r_3/r_1)$$

or $$-q_i = -2\pi K(t_2 - t_1)/ln(r_1/r_3)$$

but since heat flow in inner cylinder is reverse of outer $q_o$ must equal $-q_i$
$$2\pi K(t_2 - t_1)/ln(r_2/r_1) = 2\pi K(t_2 - t_1)/ln(r_1/r_3)$$

therefore, $$r_2/r_1 = r_1/r_3$$

A particular advantage of our viscometer is its applicability to the testing of various materials of different flow characteristics. A common classification of materials according to flow properties is:

A. The Newtonian fluid in which the ratio of shearing stress to rate of shear is constant at all rates of shear.
B. The non-Newtonian fluid in which the ratio of shearing stress to rate of shear generally decreases with increasing rate of shear. For these fluids it is necessary to specify viscosity as a function of rate of shear in addition to the usual composition and physical state.
C. The general plastic material, and the Bingham plastic as a special or idealized case thereof, is able to withstand a finite shear stress before flow begins, and like the non-Newtonian fluid the ratio of shear stress to rate of shear generally decreases with increasing rate of shear.

Most pure liquids and mineral lubricating oils are Newtonian fluids. Blends of mineral oils with polymers whose molecular weights may be many times those of the oils, paints, inks, and many other industrially important liquids may be non-Newtonian fluids. Most lubricating greases fall in the general plastic classification. The viscometer is adapted for making accurate viscosity determinations of any of these fluids but has a special field of usefulness in testing the non-Newtonian and plastic materials.

It has been desired to be able to measure the viscosity of lubricants as a function of rate of shear up to values which exist in the machine elements where they find use. Rates of shear up to and beyond 1,000,000 sec.$^{-1}$ are not uncommon in lubricated machine elements. The present invention provides for obtaining accurate and valid viscosity measurements under such high rates of shear.

In order to more fully disclose the invention reference is made to the accompanying drawings wherein.

Figure 1:
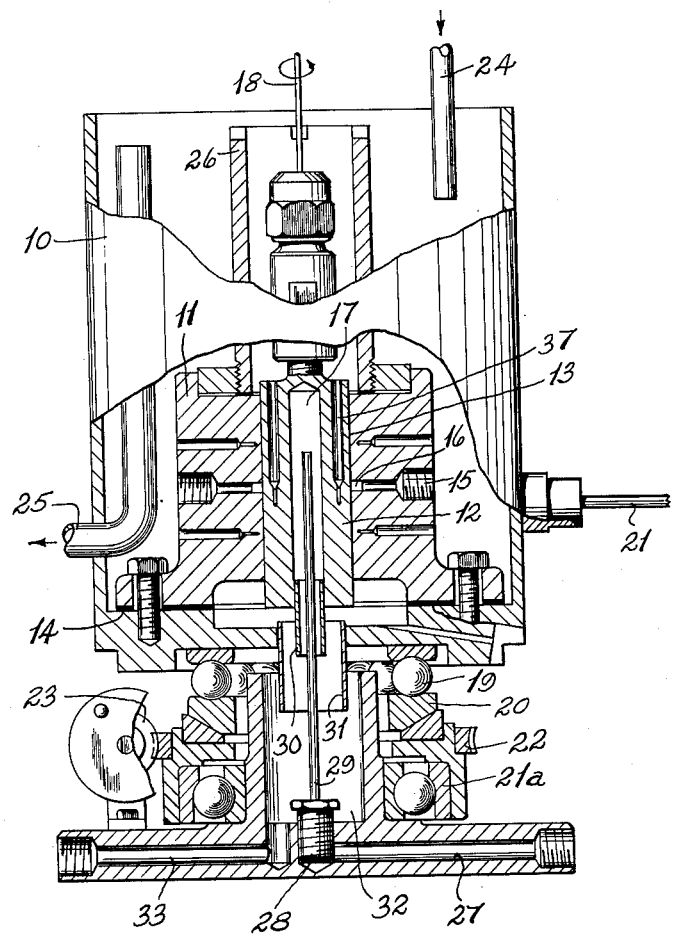
Figure 1 is a sectional elevation of a rotational viscometer constructed in accordance with the invention and constituting a preferred embodiment thereof.

As shown in Figure 1 the apparatus includes a retaining cup 10, an outer cylinder 11, and an inner cylinder or rotor 12. The material to be tested is disposed as a film at 13 in the annular space between the inner and outer cylinders. The outer cylinder is conveniently flanged for the purpose of being rigidly secured to the base of the retaining cup 10, a heat insulating spacer ring 14 being inserted between the cylinder and base of the retaining cup. Ports 15 are provided for introducing the oil, grease or other material to be tested. The ports preferably terminate in an annular groove 16.

The inner cylinder 12 is formed with a bore 17 and is connected to a drive shaft 18.

The retaining cup 10 is seated on ball bearings 19 and self aligning support bearing 20. A torque arm 21 extends to a suitable instrument (not shown) for measuring the torque in a well-known manner. The self aligning support is mounted on a radial thrust bearing 21a and a worm wheel 22 is adapted to be rotated in either direction by hand operated worm 23. Thus during a test the support bearing may be rotated in both directions and at approximately the same rate. The torque readings are added and the sum divided by two and in this way the effect of the support bearing friction may be eliminated from the evaluation. Although the support bearing friction is small the forces developed in shearing the test film may also be small under certain conditions, and with this arrangement the effect of support bearing friction is eliminated.

The temperature control liquid is admitted to the retaining cup 10 through a supply pipe 24 and is drawn off through a stand pipe 25. A sleeve 26 is provided to seal the drive shaft from the liquid to form a dead air heat barrier above the stator 11 and rotor 12. These barriers along with the insulating ring 14 tend to minimize the dissipation of heat axially. The control liquid for the rotor is introduced through a pipe 27, thence through a hollow plug 28 and tube 29 which extends into the bore 17 of the inner cylinder. A sleeve 30 is attached to the inner cylinder and protrudes within a second sleeve 31 which extends through the base of the retaining cup so as to direct the liquid into a well or reservoir at 32 from which the liquid is withdrawn by means of a pipe 33.

Figure 2:
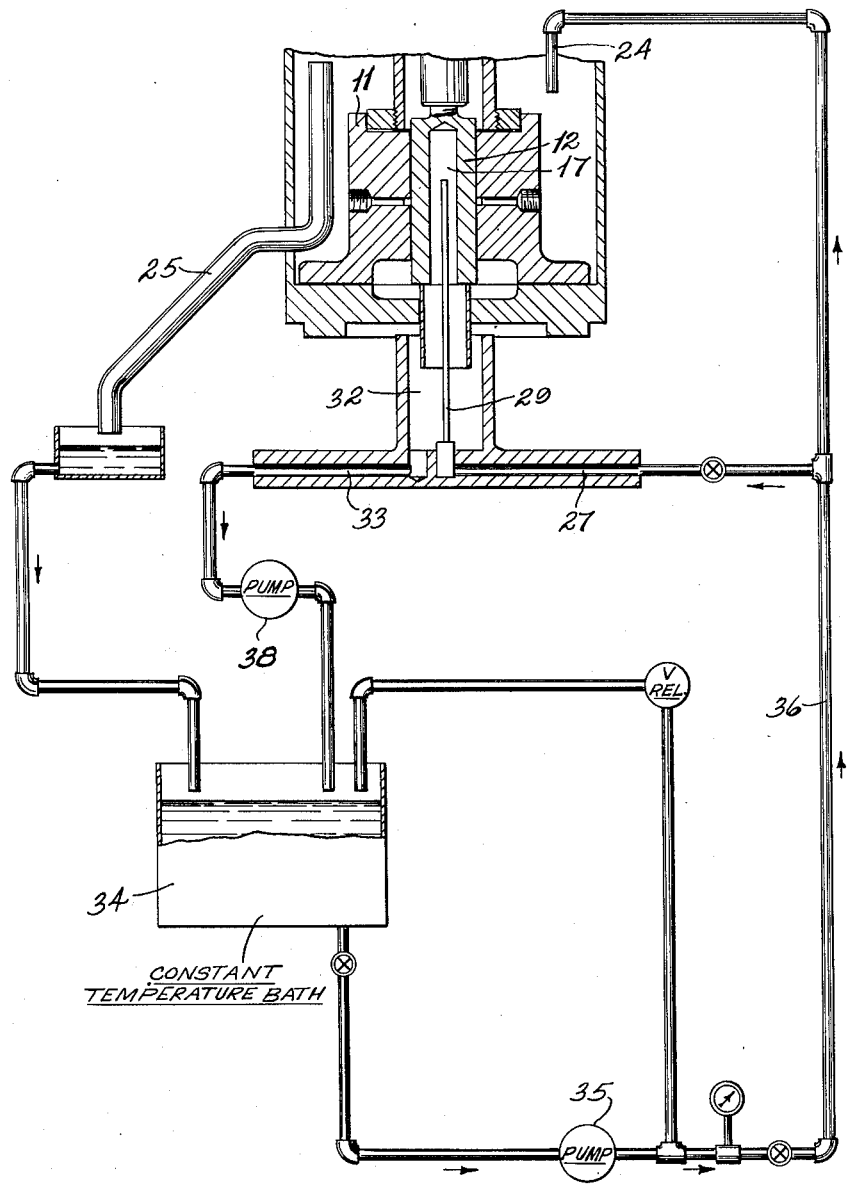
Figure 2 is a flow diagram of a temperature control system for the viscometer.

The temperature control liquid is a coolant with respect to the temperature of the film or interface. As shown in Figure 2 the control liquid is withdrawn from a constant temperature bath 34 by a pump 35 and is directed through a line 36 having branches to the pipes 27 and 24 for supplying liquid to the inner cylinder and retaining cup respectively. The overflow liquid from stand pipe 25 is returned to the constant temperature bath 34 by gravity and the liquid from the well 32 is directed by a pump 38 back to the constant temperature bath 34. The temperature of the control liquid may be adjusted to produce a selected constant value of the film temperature or the temperature of the control fluid may be held at a constant value and the viscosity related to the measured film temperature.

Thermocouple wells may be disposed at selected points in the inner and outer cylinder such as at 37 in Figure 1. It has been found that temperature points within about 1/16 of an inch from the film give accurate indications of the film temperature.

When feeding the lubricant or other material to be tested, it is advantageous to introduce it through the ports 15 under pressure so as to effect removal of air bubbles and obtain a good film of material for testing and during the test the material may be held under a mere gravity head. The material may be merely introduced at the beginning of the test or it may be continuously circulated through the test film. Thus, for example, when it is desired to obtain a shear history of a grease, the flow of the grease may be continuous and by varying and controlling the flow rate through the test bearing clearance the shear history may be readily obtained.

By way of example a viscometer was constructed in accordance with the invention with an outer cylinder having a nominal diameter of 3 inches and an inner cylinder or rotor with a nominal diameter of 1 inch and axial length of 2 inches. The radius of the bore required for the rotor was calculated in the manner indicated herein and was found to be 1/8 of an inch. In this instance a bore of 3/16 of an inch was provided in order to have a margin of safety in the supply of internal cooling to the rotor. Four inner cylinders were provided to produce nominal film thicknesses of 0.00050, 0.00020, 0.00010 and 0.00005 inch. With these clearances shear rates of 100,000; 250,000; 500,000 and 1,000,000 reciprocal seconds were obtained with negligible film temperature gradients.

While we have described a particular embodiment of our invention for purposes of illustration, it should be understood that various modifications and adaptations thereof which will be obvious to one skilled in the art, may be made within the spirit of the invention as set forth in the appended claims.

We claim:

1. A rotational viscometer comprising an outer chamber, a cylinder fixed thereto and spaced from the side wall of the chamber to form a fluid retaining jacket about the cylinder, a rotor formed with a longitudinal bore and mounted for rotation within the cylinder to provide a film space therebetween for the material to be tested, a conduit disposed to discharge a cooling fluid into the jacket about the cylinder and a conduit disposed to discharge a cooling fluid into the bore of the rotor, the bore of the rotor being of such diameter that the heat path from the film surface to the bore surface is substantially equal in resistance to the heat path from the film surface to the external surface of the cylinder.

2. A rotational viscometer comprising an outer chamber, a cylinder fixed thereto and spaced from the side wall of the chamber to form a fluid retaining jacket about the cylinder, a rotor formed with a longitudinal bore and mounted for rotation within the cylinder to provide a film space therebetween for the material to be tested, means for applying a cooling fluid to the jacket about the cylinder, means for applying a cooling fluid to the bore of the rotor, the bore of the rotor being of such diameter that the heat path from the film surface to the bore surface is substantially equal in resistance to the heat path from the film surface to the external surface of the cylinder, and means for equalizing the temperature of the cooling fluid so applied.

References Cited in the file of this patent

UNITED STATES PATENTS

| 1,236,706 | Grosvenor | Aug. 14, 1917 |
| 2,074,174 | Goodier | Mar. 16, 1937 |

FOREIGN PATENTS

| 513,876 | Great Britain | Oct. 24, 1939 |